United States Patent [19]

Rohrer

[11] 4,185,726
[45] Jan. 29, 1980

[54] FLUID COUPLING DEVICE AND BIMETAL COIL MOUNTING ARRANGEMENT

[75] Inventor: Douglas D. Rohrer, Marshall, Mich.

[73] Assignee: Eaton Corporation, Cleveland, Ohio

[21] Appl. No.: 933,309

[22] Filed: Aug. 14, 1978

[51] Int. Cl.² ............................................. F16D 43/25
[52] U.S. Cl. ................................. 192/58 B; 192/82 T
[58] Field of Search ........................... 192/82 T, 58 B

[56] References Cited
U.S. PATENT DOCUMENTS

| 3,055,473 | 9/1962 | Oldberg et al. | 192/58 B |
| 4,103,765 | 8/1978 | Tinholt | 192/82 T |

Primary Examiner—Andrew V. Kundrat
Attorney, Agent, or Firm—R. J. McCloskey; J. Yakimow; L. Kasper

[57] ABSTRACT

A fluid coupling device is disclosed of the type including a valve member actuated by a valve shaft extending through the cover, the position of the valve and valve shaft being controlled by a temperature responsive bimetal coil. The coil has a first end attached to the valve shaft and a second end (free end) received within a receiving portion of a clip member. Disposed between the second end of the coil and the receiving portion of the clip member is a resilient elastomeric member having a relatively thin wall. The clip member includes at least one wing portion which is attached to the cover to define an enclosure. The enclosure is configured to engage the elastomeric member which is compressed against the second end portion of the coil on at least two sides. The elastomeric member fills the clearance between the coil and the clip, even if the thickness of the clearance is not uniform, to increase the coefficient of friction, and the total gripping force, between the clip and coil. At the same time, the resiliency of the elastomeric member prevents the gripping of the coil by the clip from being too rigid, in cases where the fit therebetween is extremely close.

7 Claims, 11 Drawing Figures

FLUID COUPLING DEVICE AND BIMETAL COIL MOUNTING ARRANGEMENT

BACKGROUND OF THE DISCLOSURE

The present invention relates to fluid coupling devices of the type including temperature responsive bimetal elements, and more particularly, to a clip mounting arrangement for the free end of the element.

Fluid coupling devices of the type to which the present invention relates are now well known in the art and may be better understood by reference to U.S. Pat. No. 3,055,473, assigned to the assignee of the present invention. Although the present invention may be useful with many types and configurations of temperature responsive fluid couplings, it is especially advantageous on those to be used with vehicle radiator cooling fans, and will be described in connection therewith.

A typical fluid coupling device includes an output coupling member and a cover member cooperating to define a fluid chamber. The device includes a valve plate disposed to separate the fluid chamber into a reservoir and an operating chamber. An input coupling member is rotatably disposed within the operating chamber and the device includes valve means operable to control the flow of fluid between the reservoir and the operating chamber. The valve means includes a valve shaft extending outwardly through the cover means and being rotatable relative thereto. The rotational position of the valve shaft and the valve is controlled by a temperature responsive bimetal element having a first end portion connected to the valve shaft and a second end portion fixed relative to the cover means.

A problem which has arisen in connection with the use of viscous fluid couplings on four-cylinder engines relates to the greater vibration inherent in four-cylinder engines. The engine vibration is transmitted to the fluid coupling and typically, the result is excessive wear between the bimetal element and the shaft and between the bimetal element and its mounting bracket. If excessive wear occurs at either of these locations, there may be a substantial change in the temperature at which the coupling engages and/or disengages, causing unsatisfactory operation of the device.

If the wear becomes extreme, especially between the bimetal coil and the shaft, the coil may become completely detached from the device, with the result that the device will no longer be temperature responsive, but will remain either engaged or disengaged, whichever was the condition of the device at the time that the coil became detached.

A bimetal clip and assembly method capable of providing a more rigid mounting of the free end of the coil, without inducing unsatisfactory levels of hysteresis, is disclosed in copending U.S. application Ser. No. 909,755, filed May, 26, 1978, and assigned to the assignee of the present invention. The invention disclosed in Ser. No. 909,755 includes a clip member of the type which may be used with the present invention, but with the clip member in direct metal-to-metal engagement with the free end of the coil. It has been found that, as a result of variations in the fit between the coil and clip, as will be illustrated hereinafter, the coil would sometimes be gripped too rigidly, causing breakage of the coil adjacent the clip, and would sometimes be mounted too loosely, resulting in wear between the coil and shaft as described previously.

SUMMARY OF THE INVENTION

Accordingly, it is an object of the present invention to provide a temperature responsive fluid coupling device in which the free end of the bimetal element is mounted fairly rigidly by a clip member, wherein the gripping force exerted on the bimetal element is fairly uniform, regardless of manufacturing variations in the clip member.

It is a related object of the present invention to provide a simple, inexpensive mounting arrangement which achieves the above-stated objects without inducing substantial hysteresis, while at the same time increasing the coefficient of friction between the clip member and the bimetal element.

The above and other objects of the invention are accomplished by the provision of an improved arrangement for mounting a bimetal element on a fluid coupling device. The improvement comprises a clip member including a portion receiving the free end of the bimetal element, and including at least one wing portion oriented generally parallel to the adjacent surface of the cover. A resilient, elastomeric member surrounds the free end of the bimetal element and is in engagement therewith, the elastomeric member having a relatively thin wall. The free end of the bimetal element and the elastomeric member are surrounded on three sides by the receiving portion and, on the fourth side, by either the cover or the receiving portion. The improvement includes means for attaching the wing portion to the cover to define an enclosure which is configured to engage the elastomeric member and compress it against the free end of the bimetal element on at least two sides thereof.

DESCRIPTION OF THE PREFERRED EMBODIMENTS

Figure 1:
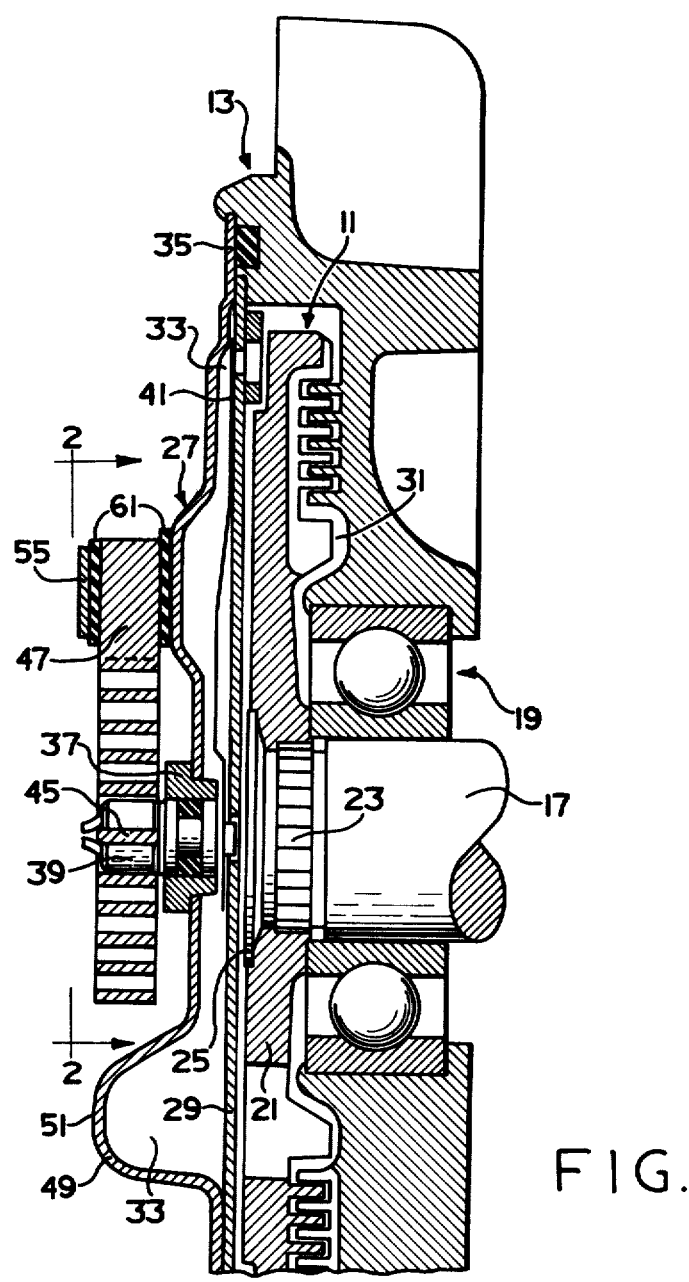
FIG. 1 is an axial cross section of a typical fluid coupling device of the type which may utilize the present invention.

Referring now to the drawings, which are not intended to limit the invention, FIG. 1 illustrates a preferred form of a fluid coupling device with which the present invention may be utilized. The fluid coupling device includes an input coupling member 11 and an output coupling member 13. The fluid coupling of the subject embodiment may be used as a drive for an automotive engine accessory, and specifically, as a drive for a radiator cooling fan. The fan (not shown) may be bolted to the output coupling member 13 by means of a plurality of threaded bores formed in the member 13. It will be understood, however, that the use of the present invention is not limited to any particular fluid coupling configuration or application.

The fluid coupling includes an input shaft 17 on which input member 11 is mounted and which is rotatably driven, typically by means of a flange (not shown) which may be bolted to the flange of the water pump (not shown). The input shaft 17 functions as a support for the inner race of a bearing set 19, which is seated on the inside diameter of the output coupling member 13.

The input coupling member 11 is in the form of a disc having a hub portion 21 supported by the forward end of the shaft 17. The hub portion 21 has an opening therethrough which has an interference fit with a serrated portion 23 of the shaft 17. The hub portion 21 is pressed onto the serrated portion 23 until it abuts the side of the inner race of the bearing set 19, and the output end (left end in FIG. 1) of the shaft 17 has a retaining portion 25, to positively retain the input coupling member 11 on the shaft 17, such that rotation of the shaft 17 causes rotation of the input coupling member 11.

The output coupling member 13 cooperates with a cover assembly, generally designated 27, to define a fluid chamber therebetween, the fluid chamber being separated by a valve plate 29 into a fluid operating chamber 31 and a fluid reservoir chamber 33.

Included within the cover assembly 27 is a stamped cover member 35 defining a central aperture which receives a generally cylindrical insert member 37. Rotatably disposed within the insert member 37, and supported thereby, is a valve shaft 39, extending "outwardly" (to the left in FIG. 1) through the cover member 35. Attached to the inner end (right end in FIG. 1) of the valve shaft 39 is a valve arm 41, the general construction and operation of which may be better understood by reference to U.S. Pat. No. 3,055,473.

Figure 2:
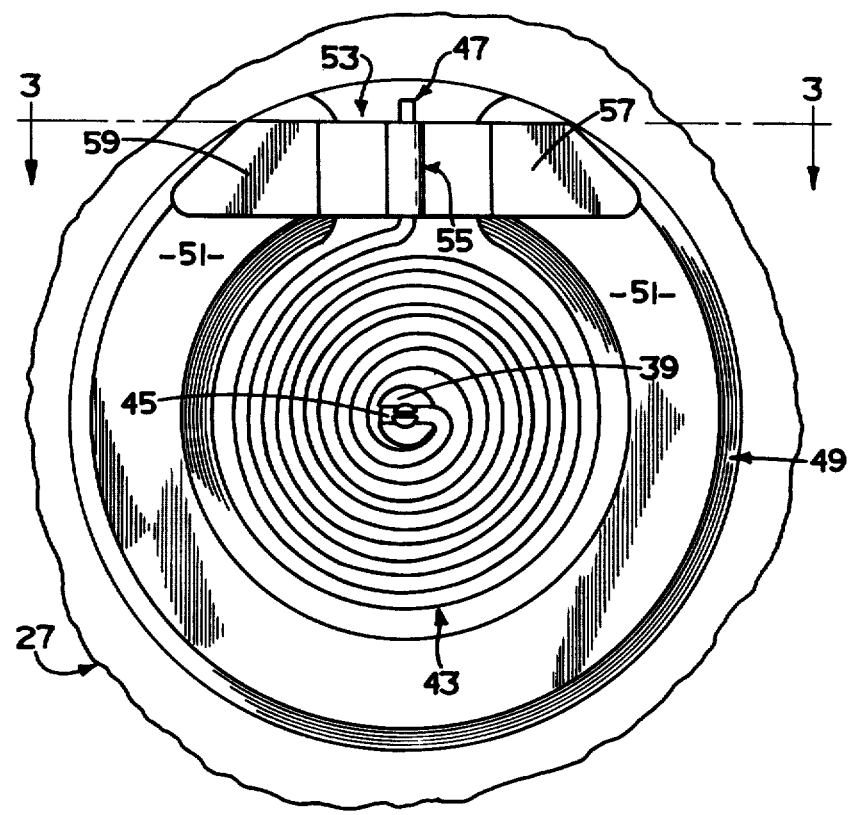
FIG. 2 is a fragmentary plan view taken on line 2—2 of FIG. 1.
Figure 3:
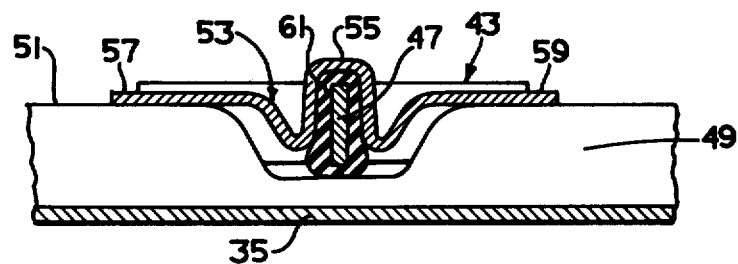
FIG. 3 is a fragmentary, transverse cross section of the cover subassembly only, taken on line 3—3 of FIG. 2, but on a larger scale than FIG. 2.

Referring now to FIGS. 2 and 3, in conjunction with FIG. 1, it may be seen that the cover assembly 27 includes a bimetal element, generally designated 43 which, in the subject embodiment, is formed in the shape of a helical coil. The bimetal coil 43 includes a first end portion 45, received within a slot formed in the outer end of the valve shaft 39. The bimetal coil 43 also includes a second end portion, generally designated 47. The cover member 35 includes a raised, generally annular reservoir portion 49, including a flat surface portion 51 oriented generally perpendicular to the axis of rotation of the fluid coupling device. The raised reservoir portion 49 has a circumferential extent which is almost a full circle, with the exception of the "valley" in which the second end portion 47 of the bimetal coil 43 is located. It should become apparent, upon a reading of the remainder of the specification, that the configuration of the cover member 35 does not form an essential part of the present invention.

It is a feature of the present invention that the cover assembly 27 includes a clip member, generally designated 53, the function of which is to maintain the second end portion 47 of the bimetal coil 43 substantially fixed relative to the cover member 35. As used herein, the term "substantially fixed" should be understood to mean that the second end portion 47 is held sufficiently rigidly to prevent the type of destructive wear and movement discussed previously in connection with the prior art.

Figure 6:
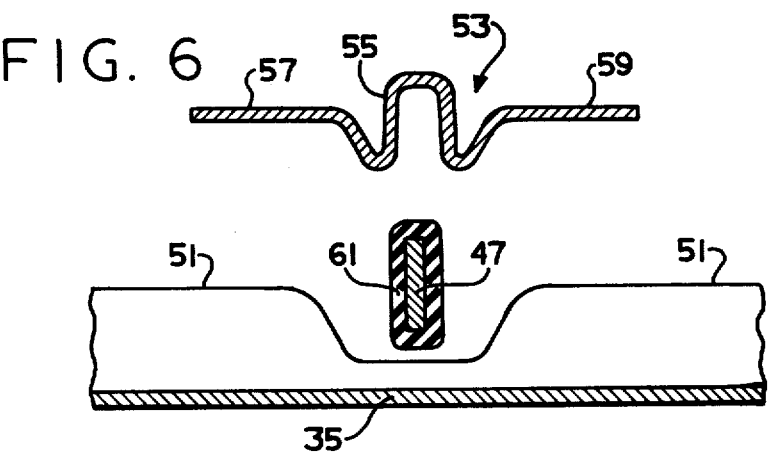
FIGS. 6, 7, and 8 are somewhat schematic illustrations of a preferred method of assembling the mounting arrangement of the present invention.

As may best be seen in viewing FIG. 6, in conjunction with FIGS. 1-3, the clip member 53 includes a downwardly-opening, generally U-shaped portion 55, which is adapted to receive the end portion 47 of the coil 43. The clip member 53 further includes a pair of wing portions 57 and 59, which are oppositely disposed about the U-shaped receiving portion 55. In the subject embodiment, each of the wing portions 57 and 59 is substantially planar, and is oriented generally parallel to the upper, flat surface 51 of the cover member 35. Accordingly, the under surfaces of the wing portions 57 and 59 engage the flat surface 51, and are fixedly attached thereto by any of several suitable means, one of which will be described subsequently, in connection with the description of the assembly method and FIGS. 6-8.

Figure 4:
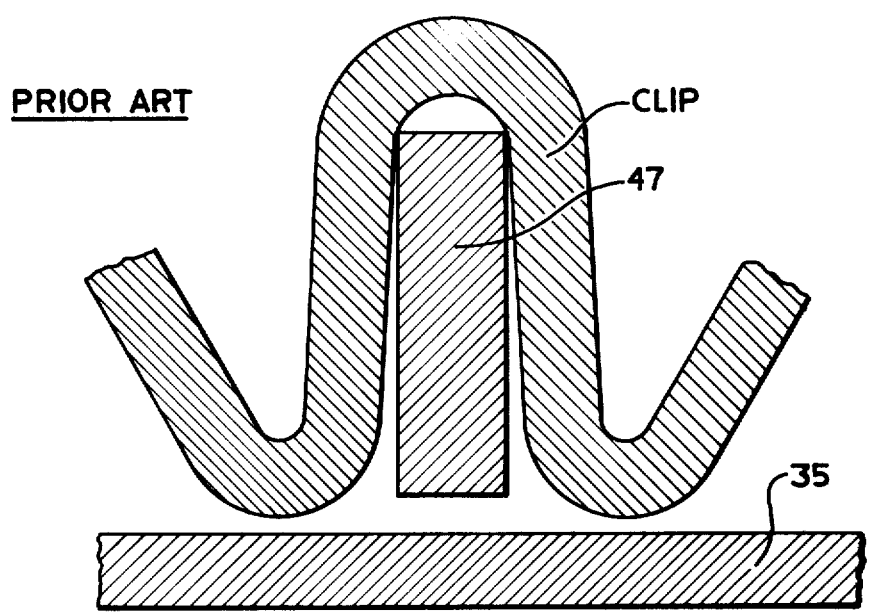
FIG. 4 is an enlarged, fragmentary view similar to FIG. 3, illustrating the prior art clip and coil relationship, utilizing a clip member of the type disclosed in above-referenced Ser. No. 909,755.
Figure 5:
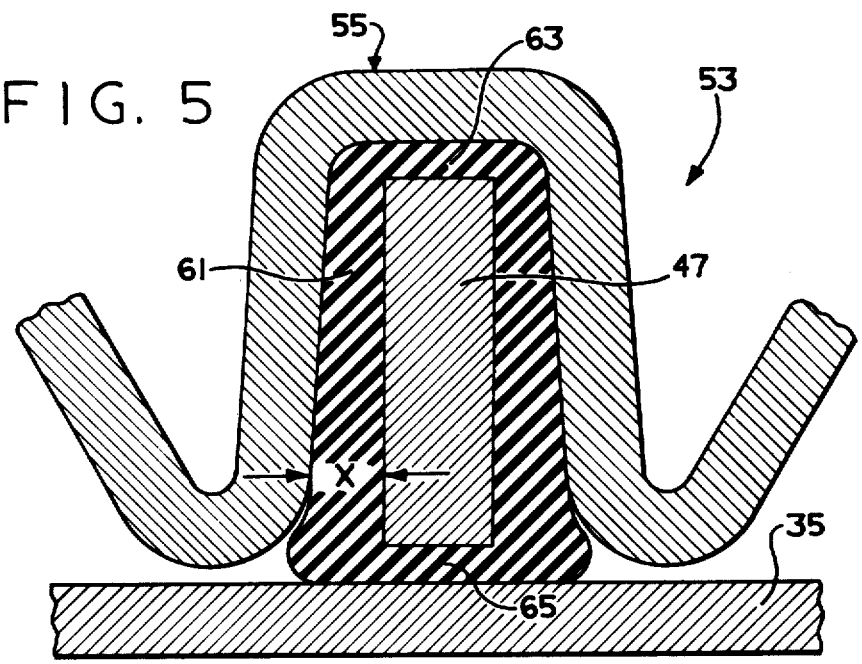
FIG. 5 is an enlarged, fragmentary view, similar to FIG. 3, illustrating the mounting arrangement of the present invention.

Referring now to FIGS. 4 and 5, the present invention will be compared to the prior art. FIG. 4 illustrates one of the typical relationships between the second end portion 47 of the bimetal coil 43 and the clip disclosed in above-referenced Ser. No. 909,755. As is shown in FIG. 4, if the sides of the receiving portion of the clip are not exactly parallel, there may be only line-to-line contact between the clip and the second end portion 47. Such minimal contact, coupled with the relatively low coefficient of friction between the metal clip and metal coil, results in a relatively low total gripping force on the end portion 47, which typically permits radial movement of the end portion 47 relative to the clip.

On the other hand, if the sides of the receiving portion of the clip are exactly parallel, or become parallel during assembly, the surface-to-surface contact between the end portion 47 and the clip can result in a gripping of the end portion 47 which is sufficiently rigid to cause breakage of the coil adjacent the clip.

Referring to FIG. 5, the present invention will now be described. Surrounding the second end portion 47 is a resilient, elastomeric member 61. As may be seen better in FIG. 6, the elastomeric member 61 preferably has a generally uniform wall thickness when it is "at rest", i.e., when it is not disposed within the receiving portion 55. The elastomeric member 61 has a relatively thin wall thickness, i.e., a wall thickness on the order of magnitude of the thickness of the coil 43 and clip 53. The assembly of the clip member 53 to the cover member 35, which will be described in FIGS. 6-8, causes the clip member 53 and cover member 35 to cooperate to define an enclosure within which the second end portion 47 and the elastomeric member 61 are contained.

Referring still to FIG. 5, it may be seen that with the clip member 53 and the cover member 35 assembled, the enclosure defined therebetween causes the elastomeric member 61 to be compressed against the second end portion 47, and it is an essential feature of the present invention that the defined enclosure have a configuration such that the elastomeric member 61 is compressed against the second end portion 47 on at least two sides. In the FIG. 5 embodiment, it may be seen that there is a substantial compression of an upper portion 63 and a lower portion 65 of the elastomeric member 61.

As may be seen by comparing FIGS. 4 and 5, the deviation of the sides of the receiving portion 55 from parallel is approximately the same in both cases. However, whereas the amount of engagement between the end portion 47 and the clip may be minimal in the prior art arrangement, the compression of the elastomeric member 61 against the end portion 47 insures that a substantial amount of gripping force will be exerted on the end portion 47. At the same time, the elastomeric member 61 insures a certain amount of resiliency between the receiving portion 55 and the end portion 47, such that the gripping of the end portion 47 by the receiving portion 55 can never be excessively rigid, a possible condition described in connection with the prior art arrangement.

It should also be appreciated from a review of FIG. 5 that the use of the present invention makes the total gripping force exerted on the end portion 47 generally independent of variations and inaccuracies in the manufacture of the clip member 53. For example, if the sides of the receiving portion 55 did not diverge in a direction toward the cover member 35, but rather, converged, the result would merely be a greater compression of the elastomeric member 61 adjacent the bottom portion 65, and less compression of the member 61 adjacent the upper portion 63, thus having little or no effect on the total gripping force exerted on the end portion 47.

Therefore, it may be seen that the present invention effectively adjusts for variations, inaccuracies, etc., in the size and shape of the clearance between the end portion 47 and the receiving portion 55. In addition, the elastomeric member 61 also provides thermal insulation to minimize the transfer of heat from the cover member 35 and clip member 53 to the bimetal coil 43, which is supposed to be responsive only to the temperature of the ambient air, and not to the temperature of the fluid coupling device itself. Accordingly, the elastomeric member 61 should be able to withstand temperatures in the range of 250 degrees F. to about 350 degrees F., without degredation.

In view of the foregoing description of the general characteristics and functions of the elastomeric member 61, it is believed that one skilled in the art would be able to select an appropriate material for the elastomeric member 61, without undue experimentation. By way of example only, some of the material which may be used for the elastomeric member 61, either individually, or in combination, include natural rubber (cured or uncured), vulcanized or unvulcanized), and synthetic organic materials such as silicone rubbers; styrenes, nitriles, acrylics and esters and terpolymers thereof, with styrene and acrylonitriles; styrene and vinyl pyridine; and EPDM rubbers as represented by butadiene polymers and copolymers with monoolefins such as butadiene-styrene copolymer, butadiene-acrylonitrile copolymer, butadiene-styrene-vinyl pyridine terpolymer, chloroprene, isoprene, neoprene, isobutyl rubber and others.

Referring again to FIG. 5, the elastomeric member 61 has an uncompressed wall thickness designated "X". As mentioned previously, the wall thickness X is typically related to the thickness of the coil 43 and clip member 53. The wall thickness X should be sufficient to provide the desired degree of resiliency and vibration damping, and prevent the member 61 from becoming hard and brittle. On the other hand, the wall thickness X should not be thick enough to permit actual radial movement of the end portion 47 relative to the receiving portion 55. Accordingly, the wall thickness X is preferably in the range of about 0.020 inches (0.508 mm) to about 0.050 inches (1.27 mm). Another important characteristic of the elastomeric member 61 as its durometer, which is the measure of the hardness of the material. Preferably, the member 61 has a durometer from about 60 to about 90 on the Shore A scale. In a potential commercial embodiment of the present invention, the elastomeric member 61 had a wall thickness X, at rest, of 0.035 inches (0.89 mm) and a durometer of 80 on the Shore A scale. It would normally be preferred to use a material having a durometer near the top of the specified range whenever the wall thickness of the member 61 is toward the top of the thickness range, and conversely, to use a material having a durometer near the low end of the specified range whenever the wall thickness is near the low end of the thickness range.

Figure 7:
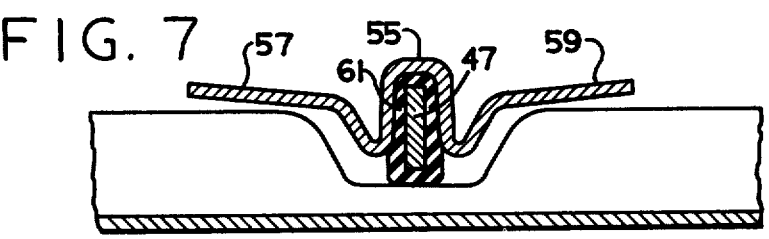
Figure 8:
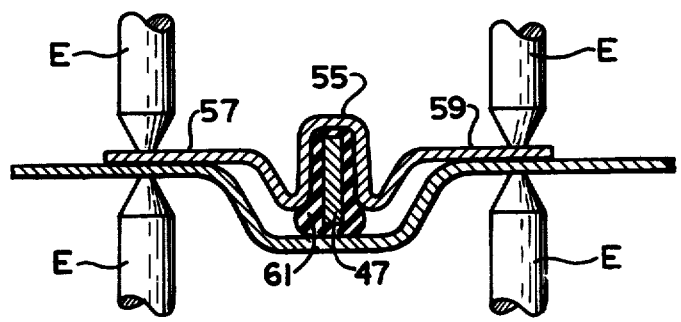

Referring now specifically to FIGS. 6–8, a preferred method of assembling the fluid coupling device of the present invention will be described. As is well known to those skilled in the art of fluid coupling devices, the device shown in FIG. 1 may be considered as comprising two subassemblies, the coupling member subassembly and the cover subassembly. It should be understood that the subsequent description will relate only to the cover subassembly, which involves welding the insert 37 to the cover member 35, attaching the valve arm 41 to the inner end of the valve shaft 39, and positioning the shaft 39 within the insert 37. Subsequently, the first end portion 45 of the bimetal coil 43 is placed into the slot of the shaft 39, and the clip member 53 is mounted on the second end portion 47 and elastomeric member 61. It should be understood that whether the mounting of the clip 53 on the coil occurs before or after the assembly of the coil and the shaft 39 is irrevelant to the present invention.

Referring still to FIGS. 6–8, the first step in that portion of the assembly method relevant to the present invention is placing the elastomeric member 61 over the second end portion 47. Although the elastomeric member 61 may be molded into a shape conforming to the end portion 47, it may be preferable from a cost standpoint to utilize a tubular member, having a nominally circular cross section, from which the individual members 61 are cut to the appropriate length.

Next, the clip member 53 is assembled to the coil 43 by placing the receiving portion 55 around the elastomeric member 61 (the position shown in FIG. 7). As described in copending Ser. No. 909,755, the end portion 47 is then permitted to achieve a "neutral" position in the radial and circumferential directions. It should also be noted that in the position of FIG. 7, the bottom portion 65 of the member 61 is relatively uncompressed, as is the upper portion 63. Also, although the wing portions 57 and 59 are described herein as being generally parallel to the surface portion 51 (as shown in FIG. 7) prior to assembly, it is an optional feature of the present invention that the wing portions 57 and 59 may have a slight upward angle for reasons which will be described in connection with FIG. 8.

Referring now to FIG. 8, the final step is to attach each of the wing portions 57 and 59 to the adjacent surface portion 51, without permitting or causing any substantial movement of the end portion 47 and clip 53, in either the radial or circumferential directions. By way of example only, FIG. 8 illustrates somewhat schematically a method in which a pair of welding electrodes E are brought into position to weld each of the wing portions 57 and 59 to the adjacent surface portion 51 of the cover member 35. If the wing portions 57 and 59 are disposed at a slight angle, as described above, the result of the movement of each pair of electrodes will be to force the respective wing portion 57 or 59 into engagement with the surface 51. Forcing the angled wing portions downward will simultaneously result in inward movement of the sides of the receiving portion 55, enhancing compression of the elastomeric member 61. It may be seen by comparing FIGS. 7 and 8 that the final step of attaching the wing portions 57 and 59 to the surface 51 causes the compression of the top portion 63 and bottom portion 65, which provides a major portion of the total gripping force acting on the end portion 47.

Figure 9:
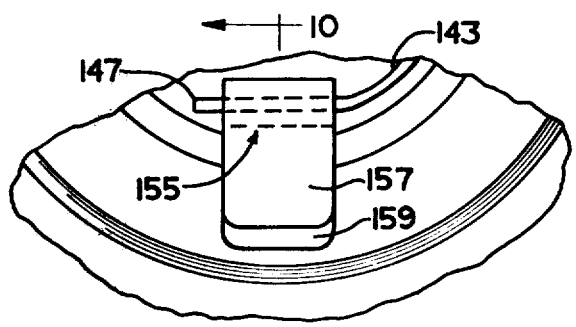
FIG. 9 is a fragmentary view, similar to FIG. 2, illustrating an alternative embodiment of the present invention.
Figure 10:
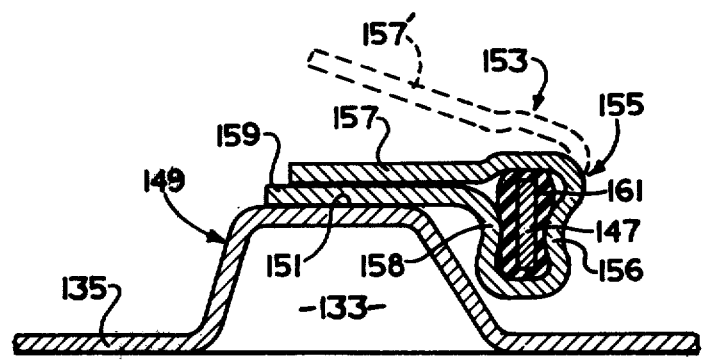
FIG. 10 is a fragmentary cross section, taken on line 10—10 of FIG. 9.

Referring now to FIGS. 9 and 10, there is illustrated an alternative embodiment of the present invention, in which similar elements are reference by like numerals, plus 100. The major differences between the embodiment of FIGS. 1-8 and the embodiment of FIGS. 9 and 10 is that the second end portion 147 is oriented tangentially, whereas the second end portion 47 was oriented radially, and the enclosure within which the end portion 147 and elastomeric member 161 is contained is defined on all four sides by the receiving portion 155. Another difference is that in the embodiment of FIGS. 9 and 10, the compression of the elastomeric member 161 against the end portion 147 is caused by a pair of inwardly projecting portions 156 and 158 of the receiving portion 155. Prior to assembly of the preferred embodiment, the clip member 153 is "open", i.e., the wing portion 157 is in the position indicated by the dashed line designated 157'. With the clip member 153 in the open position, the end portion 147 and elastomeric member 161 are assembled and inserted into the receiving portion 155. Subsequently, the wing portions 157 and 159 may be welded together to effectively form a single wing which is then welded to the surface 151. Alternatively, the wing portion 159 may be welded to the surface 151, and the wing portion 157 then welded to the combination of the wing portion 159 and surface 151.

It should be noted that, by utilizing the clip design and mounting arrangement of FIGS. 9 and 10, it is possible for the reservoir portion 149 to be truly annular, rather than being interrupted by the "valley" required for the embodiment of FIGS. 1-8. The important aspect with regard to the alternative embodiment of FIGS. 9 and 10 is to illustrate the diversity of clip designs and mounting arrangements with which the present invention may be advantageously used.

Figure 11:
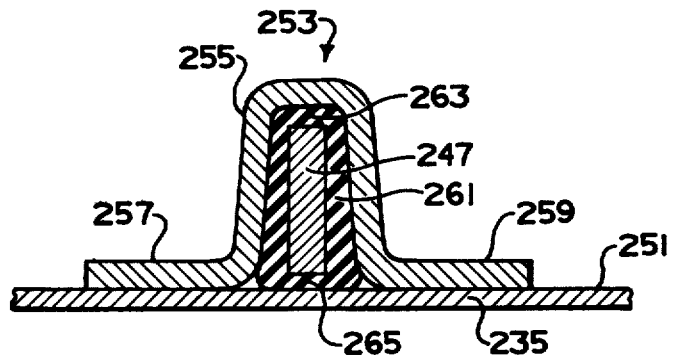
FIG. 11 is an enlarged, fragmentary cross section, similar to FIG. 3, illustrating another alternative embodiment of the invention.

Referring now to FIG. 11, there is shown another alternative embodiment of the present invention, more similar to the embodiment of FIGS. 1-8, with like elements bearing like numerals plus 200. The primary difference between the embodiment of FIG. 11 and the embodiment of FIGS. 1-8 is that the embodiment of FIG. 11 would be used with a fluid coupling design having a substantially planar cover member 235 and surface 251.

What is claimed is:

1. In a fluid coupling device of the type including a first rotatable member defining an axis of rotation, cover means associated with the first member to define a fluid chamber therebetween, a valve plate disposed to separate the fluid chamber into a fluid operating chamber and a fluid reservoir chamber, a second rotatable member disposed in the fluid operating chamber and rotatable relative to the first member, valve means operable to control fluid communication between the operating chamber and the reservoir chamber and including a valve shaft disposed generally axially and extending outwardly through the cover means and being rotatable relative thereto, a bimetal element having a first end portion operatively connected to the valve shaft and a second end portion, the improvement comprising:

(a) a clip member including a portion receiving the second end portion of the bimetal element, and including at least one wing portion oriented generally parallel to the adjacent surface portion of the cover means;

(b) a resilient, elastomeric member surrounding the second end portion of the bimetal element and being in engagement therewith, said elastomeric member having a relatively thin wall;

(c) the second end portion of the bimetal element and said elastomeric member being surrounded, on three sides, by said receiving portion and, on the fourth side, by one of the cover means and said receiving portion;

(d) means for attaching said wing portion to the cover means to define an enclosure; and (e) said enclosure being configured to engage the elastomeric member and to compress said elastomeric member against the second end portion on at least two sides thereof.

2. The improvement as claimed in claim 1 wherein said clip member includes first and second wing portions oppositely disposed about said receiving portion.

3. The improvement as claimed in claim 2 wherein said receiving portion is generally U-shaped in cross section, opening in a direction toward said cover means, and includes a pair of sides oriented generally parallel to the sides of the second end portion of the bimetal element.

4. The improvement as claimed in claim 1 wherein the bimetal element comprises a helical coil member.

5. The improvement as claimed in claims 1 or 3 or 4 wherein said elastomeric member comprises a generally tubular member having a substantially uniform wall thickness.

6. The improvement as claimed in claim 1 or 3 or 4 wherein said elastomeric member has a wall thickness in the range of about 0.020 inches (0.508 mm) to about 0.050 inches (1.27 mm).

7. The improvement as claimed in claim 6 wherein said elastomeric member has a durometer from about 60 to about 90 on the Shore A scale.

* * * * *